3,490,866
SODIUM PENTAFLUOROSTANNITE, NaSn$_2$F$_5$
Joseph C. Muhler, Indianapolis, Ind., assignor to Indiana
University Foundation, Bloomington, Ind.
No Drawing. Original application June 11, 1964, Ser. No.
374,240. Divided and this application May 22, 1967,
Ser. No. 652,642
Int. Cl. C01d 3/02
U.S. Cl. 23—88                                     1 Claim

ABSTRACT OF THE DISCLOSURE

A new composition of matter, sodium pentafluorostannite, having the formula NaSn$_2$F$_5$, is a systemically effective anticariogenic agent. Ingestion of sodium pentafluorostannite is an effective means of reducing dental caries, with anticariogenic effects being obtained, not only in treated recipients, but also, where the recipient is a pregnant female, in her ultimate offspring. Other stannous-containing fluoride salts are also similarly effective systemic anticariogenic agents.

---

This application is a divisional application of parent application Ser. No. 374,240, filed June 11, 1964, now abandoned.

This invention relates to a new composition of matter, sodium pentafluorostannite, having the formula NaSn$_2$F$_5$, and to uses thereof as a systemically effective anticariogenic agent. Further, the invention relates to a novel technique for reducing caries by the ingestion of stannous-containing fluoride salts, including the novel sodium pentafluorostannite disclosed herein, whereby systemic anticariogenic effects for the said salts may be obtained, both in treated recipients and, in the case of a pregnant female, in her ultimate offspring.

It is commonly recognized that the presence of small amounts of fluoride in drinking water (e.g., 1.0 μg. F./ml.) has a significant effect in reducing the incidence of dental caries in permanent teeth of human children consuming such water from birth through 8 years of age. Soluble fluoride salts have been introduced into public water supplies in a number of communities with good results. This method of providing fluorine is not feasible, however, where drinking water is obtained from small, private fluoride-deficient sources such as individual wells, etc., rather than from fluoridated (naturally or fortified) common public sources. Further, the addition of fluorine to common public sources is not always accepted or permitted.

Topical application of aqueous fluoride solutions by a dentist or dental hygienist provides an excellent measure of protection against caries. Various fluoride compounds have been employed in this manner, including sodium fluoride and stannous fluoride. Such topical treatments, although relatively effective, are expensive and extremely time consuming for both the profession and patient and thus are not always available to persons desiring them.

Limitations on the availability of fluoride prophylaxis by way of water supplies or the dental office have lead to extensive efforts to incorporate various fluoride salts in oral compositions for use in the home, most practicably obtained in the form of fluoride dentifrices. Although an effective toothpaste containing stannous fluoride as the anticariogenic agent and calcium pyrophosphate as the abrasive is commercially available, dental researchers have continued their efforts to find more effective anticariogenic agents and more effective manners for utilizing these agents in preventive dentistry.

This invention provides a novel anticariogenic agent in the form of sodium pentafluorostannite, which has been found to exhibit systemic anticariogenic activity after oral ingestion of the compound. Moreover, the sodium pentafluorostannite, as well as other stannous-containing fluoride salts, have been found to exert a placental transferring ability (even in the presence of calcium salts), so that dietary supplements having such stannous-containing fluoride salts formulated therein may be effectively utilized for a systemic anticariogenic effect on ultimate offspring of the recipient of the supplements.

Accordingly, it is a primary object of this invention to provide a new anticariogenic compound in the form of sodium pentafluorostannite.

It is a related object of this invention to provide compositions which contain the said anticariogenic compound and which are adapted for oral ingestion and systemic anticariogenic efficacy.

It is another object of this invention to provide a dietary supplement composition based on stannous-containing fluoride salts and having systemic anticariogenic efficacy, both in the recipient thereof and, in the case of pregnant female recipients, in her ultimate offspring.

It is a still further object of this invention to provide such dietary supplement compositions which display anticariogenic effectiveness even in the presence of calcium salts, such as in vitamin and mineral dietary supplements.

These and other objects, advantages, and features of the subject invention will hereinafter appear, and, for purposes of illustration, but not of limitation, various exemplary embodiments of the subject invention are hereinafter described in detail.

It has been found, in accordance with the subject invention, that a new compound can be prepared. The compound is called sodium pentafluorostannite and has the formula NaSn$_2$F$_5$. It has further been found that this compound is highly effective as an anticariogenic agent when utilized systemically, as hereinafter described.

FORMULATION AND CHARACTERISTICS

NaSn$_2$F$_5$ is a white, crystalline material of consistent and reproducible composition. It has a melting point of 281±1° C. and a solubility in water of 5.5% at 26° C. and 10% at 87° C. The toxicity of NaSn$_2$F$_5$ has been determined in mice (standard experimental animals for this purpose), and the toxicity data are shown in Table I with corresponding values for sodium fluoride (NaF) included for comparative purposes. The toxicity is expressed in terms of its LD$_{50}$, which is the lethal dose (in milligrams of compound per kilogram of body weight for the experimental animal) for 50% of the experimental animals being treated.

TABLE I.—TOXICITY

| Compound: | Route of administration | Test subject | LD$_{50}$ (mg. opd./ Kg. body wt.) |
|---|---|---|---|
| NaSn$_2$F$_5$ | Oral intraperitoneal | Mice | 150 / 75–80 |
| NaF | do | do | 80 / 24 |

NaSn$_2$F$_5$ can be prepared by dissolving sodium fluoride (NaF) and stannous fluoride (SnF$_2$) in the molar ratio of 1:2 in minimal amounts of hot water to which a small volume of dilute hydrofluoric acid (HF) has been added to prevent hydrolysis of the SnF$_2$. This mixture is slowly cooled to 0° C., and the precipitated NaSn$_2$F$_5$ crystals are collected by filtration. The product is then washed with minimal amounts of ice-water and dryed on paper in an oven at 65° C. Theoretical and actual chemical analyses of the product prepared in the foregoing manner are as follows:

TABLE II.—ANALYSES

| Element: | Theoretical, percent | Actual, percent |
|---|---|---|
| Tin (Sn) | 66.80 | 66.36 |
| Sodium (Na) | 6.47 | 6.61 |
| Fluorine (F) | 26.73 | 26.43 |

The $NaSn_2F_5$ salt has been characterized according to the conventional Hull-Debye-Scherrer X-ray diffraction powder technique in order to produce a film record. Exposure was made using a standard X-ray diffraction camera (diameter 114.6 mm.) for 4.0 hours at 35 kv. and 18 ma. with a copper target and a nickel filter. As is known to one skilled in the art, this technique causes all chemical compounds to emit electrons according to a pattern specific for each compound. The electrons expose a film according to a specific pattern and appear on the film as characteristic lines, the interplanar spacing of which and the relative intensity of which may be measured in order to identify the compound. Table III records measurements obtained from a film record when $NaSn_2F_5$ was treated as described, and for comparative purposes corresponding values obtained with sodium fluoride (NaF), stannous fluoride ($SnF_2$), and sodium trifluorostannite ($NaSnF_3$) have also been included. The values given under "d" are the interplanar distances expressed in Angstroms, and the values given under "I" represent the relative intensities of the lines obtained by arbitrarily assigning a value of 100 to the most intense line. The data presented in Table III show that the X-ray diffraction pattern for $NaSn_2F_5$ is distinctive and readily distinguishable from the patterns of the NaF and $SnF_2$ salts from which it is prepared and from the pattern of the $NaSnF_3$ salt.

TABLE III.—DIFFRACTION PATTERNS

| $NaSn_2F_5$ | | $NaSnF_3$ | | $SnF_2$ | | NaF | |
|---|---|---|---|---|---|---|---|
| d | I | d | I | d | I | d | I |
| 9.60 | 20 | | | 9.93 | 5 | | |
| | | 8.58 | 20 | 7.02 | 5 | | |
| 6.80 | 20 | 6.86 | 5 | 4.50 | 5 | | |
| 6.06 | 30 | | | 3.56 | 100 | | |
| | | 5.79 | 5 | 3.38 | 25 | | |
| 5.43 | 30 | | | 3.18 | 60 | | |
| 5.01 | 30 | 5.03 | 20 | | | 2.68 | 10 |
| 4.79 | 30 | | | 2.58 | 5 | 2.58 | 10 |
| 4.48 | 70 | 4.50 | 80 | 2.46 | 5 | | |
| | | 4.23 | 40 | 2.32 | <5 | 2.31 | 100 |
| 3.86 | 30 | 3.91 | 20 | 2.12 | 5 | | |
| 3.70 | 30 | | | 2.06 | 20 | | |
| 3.63 | 30 | 3.65 | 20 | 1.99 | 15 | | |
| 3.46 | 100 | 3.46 | 100 | 1.96 | 20 | | |
| 3.18 | 20 | 2.18 | 40 | 1.86 | 15 | 1.85 | 5 |
| 3.00 | 20 | 3.02 | 20 | 1.78 | 30 | | |
| | | 2.91 | 20 | 1.69 | 5 | | |
| 2.84 | 30 | 2.85 | 20 | 1.62 | 5 | 1.64 | 90 |
| 2.72 | 40 | 2.72 | 40 | 1.61 | 5 | | |
| 2.42 | 15 | | | 1.56 | <5 | | |
| 2.26 | 20 | 2.27 | 15 | 1.53 | 10 | | |
| 2.19 | 20 | 2.19 | 15 | 1.39 | 5 | 1.39 | 5 |
| 2.12 | 20 | 2.13 | 15 | 1.36 | 5 | | |
| 2.08 | 60 | 2.08 | 80 | 1.33 | 10 | 1.34 | 50 |
| | | 2.02 | 10 | | | 1.31 | <1 |
| 1.98 | 40 | 1.98 | 40 | 1.27 | <5 | | |
| | | 1.91 | 10 | 1.25 | 5 | | |
| 1.88 | 10 | 1.88 | 10 | 1.19 | 5 | | |
| 1.81 | 30 | 1.81 | 40 | 1.17 | 5 | | |
| 1.71 | 10 | 1.71 | 10 | | | 1.06 | 40 |
| | | 1.68 | 10 | | | | |
| 1.62 | 15 | 1.63 | 10 | | | | |
| 1.59 | 5 | 1.60 | 10 | | | | |
| 1.58 | 25 | 1.58 | 30 | | | | |
| 1.54 | 15 | 1.55 | 10 | | | | |
| 1.50 | 15 | 1.50 | 10 | | | | |
| 1.47 | 15 | 1.47 | 5 | | | | |
| 1.41 | 15 | 1.41 | 10 | | | | |
| 1.38 | 20 | 1.38 | 30 | | | | |
| 1.35 | 10 | 1.35 | 20 | | | | |
| 1.33 | 10 | 1.33 | 20 | | | | |
| 1.31 | 10 | 1.32 | 20 | | | | |
| 1.29 | 10 | 1.30 | 20 | | | | |
| | | 1.25 | 5 | | | | |
| 1.22 | 10 | 1.22 | 10 | | | | |
| 1.20 | 10 | 1.20 | 5 | | | | |
| | | 1.18 | 15 | | | | |
| 1.16 | 10 | 1.16 | 15 | | | | |
| 1.15 | 10 | 1.15 | 15 | | | | |
| 1.13 | 10 | 1.13 | 15 | | | | |
| 1.10 | 10 | 1.11 | 15 | | | | |
| 1.09 | 10 | 1.09 | 15 | | | | |

SYSTEMIC ANTICARIOGENIC EFFECTIVENESS OF $NaSn_2F_5$

The systemic anticariogenic effectiveness of $NaSn_2F_5$ can be demonstrated by the dental caries experience of rats (standard experimental animals for anticariogenic studies) treated with fluoridated drinking water on a comparative controlled diet study, as in the following manner.

A total of 153 weanling male rats were divided equally into three groups (1, 2, and 3) according to body weight. The animals were housed in wire cages in an air-conditioned room and were provided distilled water ad libitum. They were maintained on a low-fluoride stock corn diet for nine days prior to initiating the study and for ten days after the study was begun. The composition of the stock corn diet was as follows (in percent): yellow corn meal, 64.0; powdered whole mil, 30.0; alfalfa meal, 4.8; iodized salt, 1.0; and irradiated yeast, 0.2. For the remaining thirty days of the forty day experimental period, the animals were provided a stock corn-sucrose cariogenic diet ad libitum. The composition of the stock corn-sucrose cariogenic diet was as follows (in percent): yellow corn grits, 46.0; powdered whole milk, 28.5; sucrose, 19.5; alfalfa meal, 4.8; iodized salt, 1.0; and irradiated yeast, 0.2.

During the experimental period, each group of animals was given the following solutions daily by stomach tube: Group 1, 1.0 ml. distilled water; Group 2, 1.0 mg. fluoride as NaF in 1.0 ml. water; and, Group 3, 1.0 mg. fluoride as $NaSn_2F_5$ in 1.0 ml. water. At the end of the experimental period, the animals were sacrificed by chloroform inhalation, and the heads were removed, coded, and examined for dental caries by conventional techniques (as described by Muhler et al., "Studies on Stannous Fluoride and Other Fluorides in Relation to the Solubility of Enamel in Acid and the Prevention of Experimental Dental Caries." J. Dent. Res., 33, 33, 1954).

The dental caries data for the three groups are shown in Table IV. The control animals were found to have an average of 6.70 carious lesions, while the animals which received 1.0 mg. of fluoride as NaF daily by stomach tube were found to have an average of 4.51 carious lesions and the animals which received an identical amount of fluoride as $NaSn_2F_5$ were found to have an average of 3.69 carious lesions. As shown in Table IV this finding represents a mean percent reduction in carious lesions of 32.7% and 44.9% for NaF and $NaSn_2F_5$, respectively demonstrating a significantly ($p=0.001$) greater effectiveness with the use of $NaSn_2F_5$.

The average severity of the individual lesions was quite comparable in the three groups, but, when severity was evaluated in terms of the amount of tooth substance actually afflicted by caries, values of 30.8, 18.9, and 16.0 were obtained in Groups 1, 2, and 3, respectively.

The general findings observed in the incidence of dental caries are reflected in the data relative to the amount of tooth substance afflicted with caries. The control animals were found to have a mean carious area rating of 30.8, while values of 18.9 and 16.0 were found in Groups 2 and 3, representing significant ($p=0.001$) reductions of 38.6 and 48.1 percent, as compared to the values found in the control animals. Once again a significantly greater ($p=0.001$) effectiveness in reducing dental caries was seen with the use of $NaSn_2F_5$.

One possible explanation for the greater effectiveness of $NaSn_2F_5$ in reducing dental caries in rats is the fact that the presence of tin with fluoride apparently imparts a greater anticariogenic potential than fluoride alone. At any rate, regardless of the possible explanation, the reported caries data indicate that significant reductions can be obtained in both caries incidence and severity with both NaF and $NaSn_2F_5$ and that a significantly greater effectiveness can be attributed to $NaSn_2F_5$ as compared to NaF.

TABLE IV.—DENTAL CARIES DATA FOLLOWING SYSTEMIC ADMINISTRATION OF NaF AND NaSn₂F₅

| Regimen | Mean no. lesions | Mean percent red. | T. | P. | Mean severity | Mean carious area score | Mean percent red. in area | T. | P. |
|---|---|---|---|---|---|---|---|---|---|
| Group: | | | | | | | | | |
| 1 ____ Dist. H₂O ___ | 6.70±0.45 | | | | 2.10 | 30.8±2.5 | | | |
| 2 ____ NaF _____ | 4.51±0.51 | 32.7 | 14.411 | 0.001 | 1.99 | 18.9±2.5 | 38.6 | 15.113 | 0.001 |
| 3 ____ NaSn₂F₅ ____ | 3.69±0.45 | 44.9 | 20.743 | 0.001 | 2.02 | 16.0±2.5 | 48.1 | 18.189 | 0.001 |

PRE-NATAL UTILIZATION OF NaSn₂F₅ AND OTHER STANNOUS-CONTAINING FLUORIDE SALTS

The foregoing enamel solubility and dental caries studies exemplify the anticariogenic potential of the novel NaSn₂F₅ disclosed herein, especially with regard to the utilization of NaSn₂F₅ as a systemically effective anticariogenic agent in an orally ingested aqueous medium. However, in another of its aspects, the present invention embraces the use of NaSn₂F₅ (as well as other stannous-containing fluoride salts) particularly with regard to the pre-natal treatment of pregnant females in order to impart a lessened tendency for caries incidence in the deciduous teeth of the ultimate offspring.

It has not heretofore been recognized that certain fluoride salts have the ability to pass the placenta in order to partake in the embryonic development of the ultimate offspring and thereby to render the deciduous teeth of such offspring less susceptible to caries incidence. This placental passing nature of the fluoride salts described herein suggests the use of such salts as components of dietary supplements for pregnant females (e.g., vitamin and mineral supplements). However, it is well known that pregnant females are desirably maintained on a high calcium diet (e.g., commercial pre-natal dietary supplements contain a substantial amount of calcium salts), and therefore an essential requisite of an effective pre-natal anticariogenic technique would be the compatibility of the anticariogenic placenta passing agent with ionic calcium.

An important aspect of the present invention resides in the discovery that the ability of NaF to pass the placenta is significantly retarded by the presence of ionic calcium, while the ability of stannous-containing fluoride salts (including the novel NaSn₂F₅ disclosed herein) to similarly pass the placenta is substantially unimpaired by the corresponding presence of ionic calcium.

It has been found that stannous fluoride (SnF₂), alkali metal trifluorostannites (e.g., NaSnF₃), and alkali metal pentafluorostannites (e.g., NaSn₂F₅) are stannous-containing salts of the type described, as indicated by the following studies.

A comparative study of a variety of fluoride compounds was undertaken to determine the ability of the compounds to provide fluoride to a developing placenta and to evaluate the effect of placentally-transferred fluoride upon the future caries experience of the offspring. The study involved three test series of rats, as follows:

SERIES I

A total of 27 young adult female Wistar rats were divided into three groups of nine animals each. The animals were mated and maintained on a low-fluoride stock corn diet and the respective drinking waters hereinafter indicated. The composition of the corn diet was as follows (in percent): yellow corn meal, 64.0; powdered whole milk, 30.0; alfalfa meal, 4.3; iodized salt, 1.0; and irradiated yeast, 0.2. The fluoride salts were administered in the drinking water at a concentration of 10 p.p.m. fluoride. All drinking waters were prepared fresh daily. The various groups were: Group A, distilled water (control); Group B, NaF; and Group C, SnF₂. The pups were sacrificed immediatly after birth, ashed, and analyzed for fluoride.

SERIES II

This portion of the study was conducted in an identical manner to that employed in Series I, except that: (1) 45 young adult females were divided into five groups of nine animals each; (2) NaSnF₃ and NaSn₂F₅ were added as Groups D and E for comparative purposes; and (3) the concentration of fluoride placed in the drinking water during the pre-natal period was increased to 100 p.p.m. (i.e., by 10 times).

SERIES III

A total of ninety young adult female Wistar rats were divided into six equal groups. The animals were mated and maintained on the low-fluoride stock corn diet employed in Series I and II. The various fluorides were provided in the drinking water as follows: Group A, distilled water (control); Group B, NaF; Group C, SnF₂; Group D, KSnF₃; Group E, NaSnF₃; and Group F, NaSn₂F₅. All the fluorides were added at a concentration of 100 p.p.m. fluoride and were prepared fresh daily. At the birth of the pups all of the mothers and their litters were placed on distilled water and a corn-sucrose cariogenic diet. The composition of the corn-sucrose cariogenic diet was as follows (in percent): yellow corn grits, 46.0; powdered whole milk, 28.5; sucrose, 19.5; alfalfa meal, 4.8; iodized salt, 1.0; and irradiated yeast, 0.2. The pups were maintained on this regimen for a period of eight weeks after birth. At the end of this period, they were sacrificed by chloroform inhalation, and the heads were removed, coded, and scored for caries according to conventional methods (described in Muhler et al., op. cit., J. Dent. Res., 33, 33, 1954).

The results obtained from the fluoride analyses of the pups in Series I are shown in Table V. The control pups were found to contain an average of 0.143 μg. fluoride per pup. This fluoride content was increased to an average of 0.817 μg. fluoride in Group B where 10 p.p.m. fluoride as NaF was provided in the drinking water of the mothers. When SnF₂ was placed in the drinking water at the same fluoride level (Group C), the amount of fluoride passing the placenta and incorporated into the fetus was increased nearly 50 percent, with an average value of 1.215 μg. fluoride per pup being found.

TABLE V.—THE PLACENTAL TRANSFER OF FLUORIDE IN RATS RECEIVING 10 p.p.m. FLUORIDE IN THE DRINKING WATER (Series I)

| | | F Found in Pups | |
|---|---|---|---|
| | Compound | P.p.m. | μg./pup |
| Group: | | | |
| A | Distilled water | 1.343 | 0.143 |
| B | NaF | 7.125 | 0.817 |
| C | SnF₂ | 11.455 | 1.215 |

TABLE VI.—THE PLACENTAL TRANSFER OF FLUORIDE IN RATS RECEIVING 100 p.p.m. FLUORIDE IN THE DRINKING WATER (Series II)

| | | F Found in Pups | |
|---|---|---|---|
| | Compound | P.p.m. | μg./pup |
| Group: | | | |
| A | Distilled water | 5.842 | 0.642 |
| B | NaF | 20.490 | 1.809 |
| C | SnF₂ | 26.802 | 2.509 |
| D | NaSnF₃ | 17.054 | 1.829 |
| E | NaSn₂F₅ | 21.741 | 2.321 |

TABLE VII.—WEIGHT GAIN AND CARIES DATA IN OFFSPRING OF RATS WHICH RECEIVED 100 p.p.m. FLUORIDE IN THE DRINKING WATER ONLY DURING THE PRENATAL PERIOD (Series III)

| Prenatal regimen | Sex | Final No. animals | Mean final weight, g. | Mean No. lesions | Mean percent reduction | Mean severity | Mean area severity score | Percent reduction in area severity |
|---|---|---|---|---|---|---|---|---|
| Group: | | | | | | | | |
| A........ Dist. $H_2O$ | M | 13 | 77.1±24.0 | 11.00±3.58 | 0 | 2.32 | 63.8±25.2 | 0 |
|  | F | 16 | 69.4±24.9 | 9.94±3.34 | 0 | 2.28 | 55.6±25.7 | 0 |
| B........ NaF | M | 9 | 78.9±12.0 | 12.89±5.23 | +17.2 | 2.15 | 63.2±33.9 | 0.9 |
|  | F | 14 | 75.6±15.3 | 11.2±12.61 | +12.8 | 2.34 | 65.2±23.4 | +17.3 |
| C........ $SnF_2$ | M | 11 | 77.6±17.7 | 6.73±3.52 | 38.8 | 2.38 | 41.1±21.5 | 35.6 |
|  | F | 14 | 87.5±25.1 | 7.14±3.63 | 28.2 | 2.21 | 37.5±22.7 | 32.6 |
| D........ $KSnF_3$ | M | 11 | 98.9±34.0 | 6.45±3.03 | 41.4 | 2.11 | 31.1±19.6 | 51.3 |
|  | F | 14 | 80.9±21.8 | 6.07±2.20 | 38.9 | 1.98 | 25.4±14.3 | 54.3 |
| E........ $NaSnF_3$ | M | 9 | 93.1±16.5 | 6.00±2.24 | 45.5 | 2.02 | 25.4±11.3 | 60.2 |
|  | F | 15 | 70.9±21.0 | 5.27±2.43 | 47.0 | 2.01 | 22.2±12.1 | 60.1 |
| F........ $NaSn_2F_5$ | M | 14 | 87.6±32.5 | 4.73±2.54 | 57.0 | 1.92 | 18.7±11.6 | 70.7 |
|  | F | 12 | 89.3±19.7 | 5.60±3.78 | 43.7 | 2.02 | 24.7±18.8 | 55.6 |

The corresponding data obtained in Series II are shown in Table VI. The control pups were found to contain an average of 0.642 μg. fluoride per pup. This value is nearly five times higher than the comparable control value in Series I, and, although the exact explanation is not known, it is presumably due to the fact that the diet fed to the animals prior to the Series II study contained a relatively high amount of fluoride. The amount of fluoride found in the pups whose mothers had received 100 p.p.m. fluoride as NaF was 1.809 μg. This value was increased to 2.509 μg. fluoride per pup when $SnF_2$ was provided to the mothers. Values of 1.829 and 2.321 μg. fluoride per pup were found when the fluoride was provided as $NaSnF_3$ and $NaSn_2F_5$, respectively.

The data obtained in Series III are shown in Table VII. The control males were found to have an average of 11.00 carious lesions while a value of 9.94 was found for the females. The animals whose mothers had received 100 p.p.m. fluoride as NaF during the prenatal period were found to have an average of 12.89 and 11.21 lesions for males and females respectively. When $SnF_2$ was provided to the mothers during the pre-natal development, caries scores of 6.73 and 7.14 were found in the males and females respectively, representing reductions of 38.8 and 28.2 percent when compared to the controls. Slightly greater reductions of 41.4 and 38.9 percent were obtained when potassium trifluorostannite ($KSnF_3$) was provided as the pre-natal fluoride. Numerically greater caries reductions of 45.5 and 47.0 percent as compared to the controls were found when $NaSnF_3$ was provided during the pre-natal period. When $NaSn_2F_5$ was provided as the pre-natal fluoride, even greater reductions were obtained in the males with a 57.0 percent reduction in caries, while a 43.7 percent reduction was obtained in the females.

The caries severity values as well as the carious area severity values, which consider the average depth of the lesion and the average involved area respectively, tend to show the same general trends as shown by the number of carious lesions, although more pronounced differences are seen when the total involved area is considered. The growth data (which are also shown in Table VII) indicate that pre-natal fluoride administration had no apparent effect upon the average weight gain. In fact, numerically greater weight gains occurred in many of the pre-natal fluoride groups as compared to that of the controls.

The placental transfer data obtained in Series I indicates that, at a fluoride concentration of 10 p.p.m. provided to mother rats during pre-natal development, there is a significant increase in the fluoride content of the pups. Moreover, these data indicate that NaF and $SnF_2$ salts do not provide equal amounts of fluoride to the developing embryo. The use of $SnF_2$ as the pre-natal fluoride resulted in nearly fifty percent more fluoride being incorporated into the embryo than when NaF was used.

The data obtained in Series II indicate that when the level of fluoride provided the mothers is increased to 100 p.p.m., a concomitant increase occurs in the amount of fluoride incorporated into the developing embryo. Furthermore, a marked difference in the amount of fluoride passing the placenta occurs with the use of different fluoride salts, and a marked superiority may be seen when $SnF_2$ and $NaSn_2F_5$ are used.

The caries data obtained in Series III clearly indicate that pre-natal fluoride has an effect upon the subsequent development of caries by the offspring. While the prenatal administration of NaF resulted in a numerical increase in caries in the offspring, all of the groups which received pre-natal stannous-containing fluoride salts were found to have significant reductions in caries. The prenatal administration of $SnF_2$ resulted in caries reductions of 38.8 and 28.2 in males and females in the second generation. Somewhat greater reduction of 41.4 and 38.9 percent in males and females were obtained when $KSnF_3$ was employed as the pre-natal fluoride. The use of the corresponding sodium salt resulted in numerically greater reductions of 45.5 and 47.0 percent in the males and females. When $NaSn_2F_5$ was used as the pre-natal fluoride, the greatest anticariogenic effect was obtained with a 57.0 percent reduction being obtained in the males. A somewhat lesser reduction of 43.7 percent was obtained in the females.

The foregoing data clearly indicate that the administration of pre-natal fluorides to rats can serve to significantly alter the dental caries experience in the offspring. The data further indicate that this effect is a function of the fluoride compound being administered, since NaF failed to produce any beneficial effect, while the same level of fluoride in the forms of $NaSn_2F_5$ produced a 50 percent protection against dental caries. While the data suggest that the presence of the stannous ion is required along with the fluoride ion to produce a beneficial effect, it is apparant that the structure of the stannous-containing fluoride salt is of great importance since $SnF_2$ was only about 60 percent as worthwhile as $NaSn_2F_5$.

To summarize, a series of three studies were conducted to study the placental transfer of fluoride in rats using a variety of fluoride salts and to examine the effect of pre-natal fluoride upon the subsequent development of caries in the offspring. These studies show that at both fluoride concentrations employed (10 and 100 p.p.m. F) stannous-containing fluoride salts (i.e., $SnF_2$, $KSnF_3$, $NaSnF_3$, and $NaSn_2F_5$) were more efficient in passing the placenta than was NaF. It was also found that, while pre-natal NaF produced no beneficial caries protection in the subsequent generation, the indicated stannous-containing fluoride salts were quite effective with reductions ranging from 28.2 to 57.0 percent being obtained. It was also found that the structure of the stannous-centaining fluoride salt was of great importance, with the pentafluorostannite salt ($NaSn_2F_5$) being most effective.

CALCIUM ION COMPATIBILITY OF PRE-NATAL FLUORIDES

As previously indicated, the compatibility of the placenta-passing fluoride salt with ionic calcium is an important consideration in determining the practical effectiveness of such a salt for use in a pre-natal dietary supplement technique. The following studies demonstrate the effect of the presence of ionic calcium on: (Series V) the gastrointestinal absorption of fluoride from NaF, SnF$_2$, and NaSn$_2$F$_5$; and (Series VI) the carcass and femur retention of fluoride from NaF and NaSn$_2$F$_5$.

SERIES IV

A total of 102 weanling female Wilstar rats were divided into nine groups of eight animals each and six groups of five animals each according to body weight. The animals were maintained on a low-fluoride stock corn diet and distilled water for one week prior to initiating the study. The composition of the stock corn diet was as follows (in percent): yellow corn meal, 64.0; powered whole milk, 30.0; alfalfa meal, 4.8; iodized salt, 1.0 and irradiated yeast, 0.2. The experimental design was as 1 indicated that 50.6 percent of the fluoride was absorbed in four hours. When calcium phosphate Ca$_2$(PO$_4$)$_3$, or calcium lactate, CaC$_6$H$_{10}$O$_6$·5H$_2$O, were administered with NaF (Groups 6 and 7), the absorption in four hours was 47.2 and 40.4 percent, respectively. Thus, the presence of calcium tends to decrease the gastrointestinal absorption of fluoride from NaF solutions.

The GI tracts of the animals in Group 8 contained an average of 700.0 μg. of fluoride. This value compared to that obtained for the animals in Group 2 (961.5 μg. fluoride) indicates that 27.2 percent of the fluoride was absorbed in four hours. When 1.0 mg. calcium was given as CaCO$_3$, Ca$_2$(PO$_4$)$_3$, or CaC$_6$H$_{10}$O$_6$·5H$_2$O in addition to the fluoride (Groups 9–11, respectively), the percent of fluoride absorbed in four hours was 35.5, 40.1 and 28.9, respectively.

TABLE IX.—THE GASTROINTESTINAL ABSORPTION OF FLUORIDE AS NaF, SnF$_2$, AND NaSn$_2$F$_5$ IN THE PRESENCE OF IONIZED CALCIUM AS CaCO$_3$, Ca$_2$(PO$_4$)$_3$, AND CaC$_6$H$_{10}$O$_6$·5H$_2$O IN RATS

| Regimen [1] | Number animals | Mean μg. F found | Mean μg. F. absorbed | Mean percent F absorbed | Effect of Ca++ in percent Abs. |
|---|---|---|---|---|---|
| Group: | | | | | |
| 1 — NaF [2] | 5 | 1,016.3±32.2 | | | |
| 2 — SnF$_2$ [2] | 5 | 961.5±12.92 | | | |
| 3 — NaSn$_2$F$_5$ [2] | 5 | 1,038.8±19.32 | | | |
| 4 — NaF | 5 | 490.7±33.4 | 525.6 | 51.71 | |
| 5 — NaF plus CaCO$_3$ | 8 | 502.3±31.1 | 415.0 | 50.57 | 2.20 |
| 6 — NaF plus Ca$_2$(PO$_4$)$_3$ | 8 | 536.1±38.1 | 480.2 | 47.24 | 8.63 |
| 7 — NaF plus CaC$_6$H$_{10}$O$_6$·5H$_2$O | 8 | 605.3±32.2 | 411.0 | 40.44 | 21.80 |
| 8 — SnF$_2$ | 5 | 700.0±38.1 | 261.5 | 27.19 | |
| 9 — SnF$_2$ plus CaCO$_3$ | 8 | 620.3±29.3 | 341.2 | 35.48 | +30.47 |
| 10 — SnF$_2$ plus Ca$_2$(PO$_4$)$_3$ | 8 | 575.6±29.4 | 385.9 | 40.13 | +47.57 |
| 11 — SnF$_2$ plus CaC$_6$H$_{10}$O$_6$·5H$_2$O | 8 | 683.6±20.5 | 277.9 | 28.90 | +6.27 |
| 12 — NaSn$_2$F$_5$ | 5 | 704.5±54.8 | 334.3 | 32.18 | |
| 13 — NaSn$_2$F$_5$ plus CaCO$_3$ | 8 | 635.2±28.9 | 403.6 | 38.85 | +20.72 |
| 14 — NaSn$_2$F$_5$ plus Ca$_2$(PO$_4$)$_3$ | 8 | 846.1±50.2 | 392.7 | 37.80 | +14.87 |
| 15 — NaSn$_2$F$_5$ plus CaC$_6$H$_{10}$O$_6$·5H$_2$O | 8 | 750.8±16.9 | 288.0 | 27.72 | 13.84 |

[1] All fluoride compounds were administered as 1.0 mg. F; all calcium compounds administered as 1.0 mg. calcium dissolved in aqueous solution.
[2] All animals were sacrificed immediately after tubing the fluoride, thus serving as respective controls at time zero.

shown in Table VIII. The fluoride solutions were prepared at their natural pH at a concentration of 1000 p.p.m. fluoride (1.0 mg. F./ml.). The calcium salts (1.0 mg. ca./ml.) were completely dissolved with the aid of a minimal amount of 3 N HCl.

The animals were given the respective aqueous solutions containing either fluoride or calcium by intubation using a tuberculin-type syringe and a polyethylene catheter. When the animals were given both fluoride and calcium, the two solutions were intubated within one minute, with the calcium solution being intubated before the fluoride solution. Four hours following the intubation, the animals were sacrificed (except those in Groups 1, 2, and 3 which were sacrificed immediately after intubation to serve as a control at time zero). The gastrointestinal tract was immediately ligated at the esophagus and rectum and removed in its entirety, and the complete segment was prepared and analyzed for fluoride.

The results obtained from the analyses of the gastrointestinal (GI) tracts are summarized in Table IX. The GI tracts of the control animals in Group 1 (animals receiving 1.0 mg. fluoride as NaF and sacrificed at time zero) contained an average of 1016.3 μg. of fluoride. The GI tracts of control animals in Groups 2 and 3, which received SnF$_2$ and NaSn$_2$F$_5$, respectively, were found to contain averages of 961.5 and 1038.8 μg. of fluoride, respectively.

The GI tracts of animals in Group 4 receiving 1.0 mg. of fluoride as NaF were found to contain an average of 490.7 of fluoride at the completion of the four hour absorption period. This value compared to the data obtained in the animals in Group 1 indicates that 51.7 percent of the total amount of fluoride present at time zero was absorbed during the four hour period. The GI tracts from the animals in Group 5 (i.e., the administration of calcium carbonate, CaCO$_3$) were found to contain an average of 502.3 μg. of fluoride, which when compared to the value of fluoride found in the GI tracts of the animals of Group Analyses of the GI tracts of the animals receiving 1.0 mg. fluoride as NaSn$_2$F$_5$ showed that an average of 704.5 μg. of fluoride remained after the four-hour absorption period and indicated that about 32.2 percent of the fluoride was absorbed (Group 12 compared with Group 3). When the fluoride from NaSn$_2$F$_5$ was given in the presence of either CaCO$_3$, Ca$_2$(PO$_4$)$_3$, or CaC$_6$H$_{10}$O$_6$·5H$_2$O (Groups 13–15, respectively), the percent of fluoride absorbed in four hours was 38.9, 37.8, and 27.7, respectively.

A comparison of the amount of fluoride found in Groups 1 and 4 indicates that, when NaF was used in the absence of added calcium, 51.7 percent of the fluoride present was absorbed during the four hour period. When similar comparison is made with SnF$_2$ (Groups 2 and 8), it may be seen that 27.2 percent of the fluoride was absorbed under these experimental conditions. When NaSn$_2$F$_5$ was employed (Groups 3 and 12), 32.1 percent of the fluoride was absorbed during the absorption period.

The effect of ionic calcium upon the absorption of fluoride from each of these compounds produced rather unexpected results. The presence of 1.0 mg. calcium as calcium carbonate (Group 5) did not significantly alter the rate of absorption of fluoride as NaF although a slight decrease of 2.2 percent was noted. The presence of calcium phosphate (Group 6) was found to decrease the absorption of NaF by 8.6 percent, while the same amount of calcium lactate (Group 7) significantly decreased fluoride absorption by 21.8 percent. Of the calcium salts employed, only calcium lactate was soluble in water and dissolution of the other calcium salts was performed with the aid of hydrochloric acid, and further, the pH of the calcium lactate was nearly neutral, while that of the other calcium salts was acidic. These data suggest that pH may alter the rate of fluoride absorption.

The presence of ionic calcium as calcium carbonate (Group 9) significantly increased the rate of fluoride absorption from SnF$_2$ by 30.5 percent. An even more pronounced increase in the rate of fluoride absorption was observed when calcium phosphate was intubated along with the $SnF_2$ (Group 10). In the latter instance, the rate of fluoride absorption was increased by 47.6 percent. When calcium lactate was intubated along with the $SnF_2$ (Group 11), a slight increase in the rate of fluoride absorption of 6.3 percent was found, but this increase was not statistically significant.

When calcium carbonate was intubated along with $NaSn_2F_5$ (Group 13), an increase of 20.7 percent in the rate of fluoride absorption was noted. When the calcium was provided as the phosphate salt (Group 14), an increase in the fluoride absorption rate of 14.9 percent was found, while the use of an identical amount of calcium lactate (Group 15) decreased the rate of fluoride absorption by 13.8 percent.

It is apparent that the rate of fluoride absorption is retarded when stannous-containing fluoride compounds are employed as compared to the NaF, although the presence of ionic calcium tends to decrease the rate of fluoride absorption from NaF while it tends to have the reverse effect when tin-containing fluoride salts are utilized. These data further suggest that the pH of the absorption environment may significantly alter the rate of fluoride absorption and that the presence of calcium from different sources may alter the rate of fluoride absorption to varying degrees.

SERIES V

A total of 110 weanling female Wistar rats were divided into eleven equal groups according to body weight. All animals were housed in wire screen cages in an air-conditioned room and received distilled water ad libitum. The animals were provided with one of the following diets ad libitum: Groups A, B, and G, a low fluoride stock diet, the composition of which was as follows (in percent): yellow corn meal, 64.0; powdered whole milk, 30.0; alfalfa meal, 2.8; iodized salt, 1.0; and irradiated yeast, 0.2; Groups C and H, a diet containing added 0.4 percent calcium as calcium carbonate added at the expense of corn meal; Groups D and I, a diet containing 0.5 percent added calcium as calcium lactate; Groups E and J, a diet containing 0.5 percent added calcium as monobasic calcium phosphate; and Groups F and K, a diet containing 0.5 percent added calcium as dibasic calcium phosphate. In addition, the animals in Groups B through F received 1.0 mg. fluoride as NaF daily by stomach tube, while the animals in Groups G through K received the same amount of fluoride in a similar manner as $NaSn_2F_5$. The animals were maintained on these respective regimens for thirty days. At the end of the thirty day interval, the animals were sacrificed by chloroform inhalation, and the pelts and both femurs were removed. The carcasses and the femurs were separately ashed and analyzed for fluoride.

The results obtained from the fluoride analyses are summarized in Table X. The carcasses of the control animals (Group A) contained an average concentration of 213.8 p.p.m. fluoride and a total amount of 932.7 µg. The carcasses of the animals which received the stock corn control diet and 1.0 mg. fluoride as NaF daily (Group B) contained an average of 17.85 mg. of fluoride with a mean concentration of 4091 p.p.m. When 0.5 calcium as calcium carbonate was added to the diet (Group C), the carcasses contained a total of 16.05 mg. of fluoride with a mean concentration of 3530 p.p.m. The carcasses of the animals in Group D, which received identical amounts of NaF and calcium as calcium lactate, were found to contain an average of 15.16 mg. of fluoride with a mean concentration of 3969 µg. fluoride per gram of ash. The use of calcium dihydrogen phosphate as a source of calcium (Group E) resulted in a mean carcass fluoride content of 14.72 mg. with a concentration of 3075 p.p.m. Slightly lower values of 14.44 mg. of fluoride and a concentration of 2839 p.p.m. was found in Group F where dicalcium phosphate was used as a source of added dietary calcium.

The daily intubation of 1.0 mg. F as $NaSn_2F_5$ in the presence of a low calcium diet (Group C) resulted in a mean carcass fluoride value of 16.16 mg. with a concentration of 4331 p.p.m. When 0.5 percent calcium was added to the diet as calcium carbonate (Group H), only slight differences were noted with a mean carcass fluoride value of 16.26 mg. and a concentration of 4190 p.p.m. When calcium lactate was used as a source of calcium (Group I), slight decreases in fluoride retention were noted with a total of 15.48 mg. and a concentration of 4189 p.p.m. fluoride being found. There was a tendency toward an increased retention of fluoride in the presence of added dietary calcium as calcium phosphate. The use of calcium dihydrogen phosphate (Group J) resulted in a total carcass retention of 16.57 mg. fluoride, while 16.73 mg. of fluoride was retained in the carcasses in the presence of dicalcium phosphate (Group K).

The results obtained from the femur fluoride analyses are also shown in Table X. These data tend to reflect the findings noted in the whole carcasses. The femurs from the Group A animals which received the stock corn diet and no supplemental fluoride contained a total of 75.3 mg. of fluoride, while those from the Group B animals, which were maintained on the same control diet but received daily intubations of NaF, contained a total of 1740 mg. of fluoride. When added dietary calcium was present as the carbonate, lactate, dihydrogen phosphate, and dicalcium phosphate salts (Groups C through F, respectively), totals of 1410, 1370, 1450, and 1430 µg. of fluoride were found. When the same level of fluoride was intubated as $NaSn_3F_5$ in the absence of added dietary calcium (Group G), a total of 1510 µg. of fluoride was found in the femurs. With the addition of dietary calcium as calcium carbonate, calcium lactate, calcium dihydrogen phosphate, and dicalcium phosphate (Group H through K, respectively), comparable femur fluoride levels of 1590, 1490, 1590, and 1520 µg. were found.

The effect of added dietary calcium upon the retention of fluoride administered as NaF is very pronounced. The addition of 0.5 percent calcium as calcium carbonate (Group C) reduced the carcass fluoride retention by 10.1 percent, this value being significant at the 0.001 level. When calcium lactate was added to the diet as the source of calcium, the retention of fluoride as NaF was again significantly ($p=0.001$) decreased by 15.1 percent, as compared to the respective control value obtained in Group B. Even more pronounced decreases were found when the calcium was added as the phosphate salts (Groups E and F). Here highly significant ($p=0.001$) decreases in fluoride retention of 17.5 and 19.1 percent were found.

The effects of identical dietary calcium levels upon the retention of fluoride administered as $NaSn_2F_5$ are in contrast to those obtained when NaF was used as a source of fluoride. The addition of 0.5 percent calcium to the diet resulted in no significant changes in the retention of fluoride in the whole carcass as compared to the amount retained in the absence of added dietary calcium. This effect was noted in all four groups which received added dietary calcium, with the solubility and physical properties of the particular calcium salt employed as a source of calcium having no detectable effect upon the retention of fluoride.

The results obtained in the femur analysis quite closely parallel the findings obtained in the analyses of the whole carcass. Again, the addition of dietary calcium significantly ($p=0.01$) decreased the skeletal retention of fluoride administered as NaF. When $NaSn_2F_5$ was used as a source of fluoride, none of the calcium-enriched diets were found to appreciably alter the retention of fluoride.

These data confirm the results obtained in the Series IV studies investigating the effect of calcium upon the rate of the fluoride absorption. In those studies, the rate of fluoride absorption in rats was decreased when ionic calcium was present and NaF was used as a source of fluoride. In contrast, when $NaSn_2F_5$ was employed as a source of fluoride, the rate of fluoride absorption was increased by the presence of ionic calcium. No explanation of these findings is readily apparent, but these data clearly indicate the specificity involved in the use of different fluoride compounds in the presence of different sources of calcium. It is apparent that factors known to influence the metabolism of NaF may exert completely different effects upon the metabolism of stannous-containing forms of fluoride salts.

The results of this Series V experiments indicate that all four calcium salts added to the diet at 0.5 percent calcium significantly decreased the retention of fluoride in the skeleton and whole carcass when the fluoride was administered as NaF. However, when the fluoride was administered as $NaSn_2F_5$, the presence of added dietary calcium exerted no detectable effect upon fluoride retention.

supplement in accordance with the subject invention may comprise:

| | |
|---|---|
| Fluoride (as $NaSn_2F_5$), mg. | 1.0 |
| Iron (as ferrous fumarate), mg. | 40 |
| Calcium carbonate, mg. | 250 |
| Ascorbic acid, mg. | 100 |
| Thiamine ($B_1$), mg. | 1.5 |
| Riboflavin ($B_2$), mg. | 2.5 |
| Niacinamide, mg. | 15 |
| Pyridoxine ($B_6$), mg. | 3 |
| Calcium pantothenate, mg. | 5 |
| Cyanocobalamin ($B_{12}$), mg. | 2 |
| Vitamin A, USP units | 6000 |
| Vitamin D, USP units | 400 |

TABLE X.—CARCASS AND FEMUR FLUORIDE DATA IN THE PRESENCE AND ABSENCE OF ADDED DIETARY CALCIUM

| | Supplemental Ions | | Carcass Data | | | Femur Data | | | Net percent F Ret.[2] | Percent change due to C. |
|---|---|---|---|---|---|---|---|---|---|---|
| | F (1.0 mg./da.) | Calcium (0.5%) | Mean ash wt., g. | Mean, p.p.m. F | Mean, μg. F | Mean ash wt. (mg.) | Mean, p.p.m. F | Mean, μg. F | | |
| Group: | | | | | | | | | | |
| A | | | [1] 4.345±0.143 | [1] 213.8±12.6 | [1] 932.7±52.7 | [1] 291.5±12.2 | [1] 261.4±18.1 | [1] 75.3±5.0 | | |
| B | NaF | | 4.399±0.169 | 4091±181 | 17,850±440 | 293.5±14.8 | 5,979±316 | 1,740±60 | 61.96 | |
| C | NaF | $CaCO_3$ | 4.569±0.097 | 3530±127 | 16,050±410 | 292.0±8.2 | 4,858±180 | 1,410±50 | 54.86 | −11.5 |
| D | NaF | $CaC_6H_{10}O_65H_2O$ | 3.842±0.146 | 3969±176 | 15,160±670 | 250.9±10.9 | 5,519±268 | 1,370±70 | 51.76 | −16.5 |
| E | NaF | $Ca(H_2PO_4)_2H_2)$ | 4.812±0.121 | 3075±124 | 14,720±480 | 434.3±13.7 | 4,241±139 | 1,450±50 | 50.56 | −18.4 |
| F | NaF | $CaHPO_4$ | 5.113±0.206 | 2839±91 | 14,440±600 | 358.5±10.8 | 3,990±154 | 1,430±60 | 49.56 | −20.0 |
| G | $NaSn_2F_5$ | | 3.816±0.212 | 4331±200 | 16,160±340 | 237.7±14.7 | 6,546±379 | 1,510±30 | 55.56 | |
| H | $NaSn_2F_5$ | $CaCO_3$ | 3.940±0.194 | 4190±158 | 16,260±390 | 258.9±15.7 | 6,207±216 | 1,590±70 | 56.16 | +1.1 |
| I | $NaSn_2F_5$ | $CaC_6H_{10}O_65H_2O$ | 3.706±0.078 | 4189±65 | 15,480±380 | 248.5±8.4 | 5,985±140 | 1,490±80 | 53.23 | −4.2 |
| J | $NaSn_2F_5$ | $Ca(H_2PO_4)_2H_2O$ | 3.720±0.157 | 4555±225 | 16,570±460 | 252.1±13.1 | 6,403±299 | 1,590±70 | 57.20 | +3.0 |
| K | $NaSn_2F_5$ | $CaHPO_4$ | 4.221±0.211 | 3986±175 | 16,730±410 | 279.8±17.0 | 5,531±240 | 1,520±50 | 57.50 | +3.5 |

[1] Standard deviation of the mean.
[2] Obtained by combining carcass and femur values and subtracting the respective control values.

The foregoing animal studies are confirmed by the human clinical data shown in Table XI. In the human evaluations, three groups of mothers (Groups 1, 2, and 3) were supplied daily tablets containing 1 mg. F (as $NaSn_2F_5$), 1 mg. F (as NaF), and 1 mg. Cl (as NaCl), constituting manitol, a conventional carrier which is not metabolized in the oral cavity. All mothers commenced ingestion of the pills within three months of conception and continued daily ingestions until parturation. The two and three year caries history of the resultant children are expressed in Table XI in terms of "deft" (decayed, exfoliated, and filled deciduous teeth) and "defs" (decayed, exfoliated, and filled deciuous surfaces).

It is apparent from these results that pre-natal NaF provides no significant caries control for ultimate offspring, while pre-natal $NaSn_2F_5$ significantly reduces caries susceptibility in the offspring. This phenomenon can be explained only by the unique ability of the stannous-containing fluoride salt (i.e., in this study, $NaSn_2F_5$) to pass through the placenta and to affect the formation of the offspring's teeth in a manner that yields improved oral hygiene even up to three years after birth.

While the Table XI studies were undertaken with a pill consisting of a manitol carrier and the $NaSn_2F_5$ anticariogenic agent, it should be obvious to one skilled in the art that the unique pre-natal introduction of stannous-containing fluoride salts can be readily accomplished with a variety of well-known carrier media, including the medium of a pre-natal calcium-containing dietary supplement, especially in view of the previously described animal studies concerning the effect of calcium ion on fluoride absorption and retention. By way of example, a pre-natal TABLE XI.—$NaSn_2F_5$ PRE-NATAL HUMAN STUDIES

| | No. mothers | No. children | 2 Years | | 3 Years | |
|---|---|---|---|---|---|---|
| | | | Deft | Defs | Deft | Defs |
| Group: | | | | | | |
| 1 | 56 | 61 | 0.84 | 1.22 | 3.61 | 4.88 |
| 2 | 56 | 55 | 2.99 | 5.14 | 6.08 | 9.75 |
| 3 | 49 | 45 | 3.85 | 5.81 | 6.10 | 10.10 |

It should be understood that various changes and modifications may be effected in the details of formulation and the manner of application of the various exemplary embodiments described herein, without departing from the spirit and the scope of the instant invention, as defined in the appended claim.

What is claimed is:

1. Sodium pentafluorostannite, $NaSn_2F_5$, a white, crystalline compound melting at about 281° C. and having a Hull-Debye-Scherrer X-ray powder diffraction pattern substantially as shown in Table III.

References Cited

UNITED STATES PATENTS 3,005,684  10/1961  Riedl et al. _____ 23—88
3,063,799  11/1962  Hinkle _____ 23—88

OTHER REFERENCES

Chemical Abstracts, vol. 58, pp. 4140 and 4141 (1963).
Donaldson et al., J. Chem. Soc., 1964, pp. 271–5, Jan. 1964, 167–93F.

EDWARD STERN, Primary Examiner

U.S. Cl. X.R.
23—53; 424—52